United States Patent
Suh et al.

(10) Patent No.: US 10,083,343 B2
(45) Date of Patent: Sep. 25, 2018

(54) METHOD AND APPARATUS FOR FACIAL RECOGNITION

(71) Applicant: Samsung Electronics Co., Ltd., Suwon-si, Gyeonggi-do (KR)

(72) Inventors: Sungjoo Suh, Seoul (KR); Wonjun Hwang, Seoul (KR); Wonjun Kim, Hwaseong-si (KR); Jaejoon Han, Seoull (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 386 days.

(21) Appl. No.: 14/795,002

(22) Filed: Jul. 9, 2015

(65) Prior Publication Data
US 2016/0042223 A1  Feb. 11, 2016

(30) Foreign Application Priority Data
Aug. 8, 2014  (KR) .................. 10-2014-0102177

(51) Int. Cl.
*G06K 9/00* (2006.01)
*G06K 9/62* (2006.01)

(52) U.S. Cl.
CPC ..... *G06K 9/00221* (2013.01); *G06K 9/00228* (2013.01); *G06K 9/00248* (2013.01);
(Continued)

(58) Field of Classification Search
CPC .......... G06K 9/00221; G06K 9/00228; G06K 9/00248; G06K 9/00281; G06K 9/00288;
(Continued)

(56) References Cited

U.S. PATENT DOCUMENTS

| | | |
|---|---|---|
| 6,084,989 A | 7/2000 | Eppler |
| 6,773,400 B2 | 8/2004 | Njemanze |

(Continued)

FOREIGN PATENT DOCUMENTS

| | | |
|---|---|---|
| KR | 2009-0093223 A | 9/2009 |
| KR | 2009-0128038 A | 12/2009 |

(Continued)

OTHER PUBLICATIONS

Feng, G.C., et al., "Recognition of Head & Shoulder Face Image Using Frontal-View Image," IEEE Transactions of Systems, Man and Cybernetics, vol. 30, No. 6, Nov. 1, 2000.

(Continued)

*Primary Examiner* — Mohammed Rahaman
*Assistant Examiner* — Jimmy S Lee
(74) *Attorney, Agent, or Firm* — Harness, Dickey & Pierce, P.L.C.

(57) ABSTRACT

At least some example embodiments disclose a method and apparatus for facial recognition. The facial recognition method includes detecting initial landmarks from a facial image, first normalizing the facial image using the initial landmarks, updating a position of at least one of intermediate landmarks based on the first normalizing, the intermediate landmarks being landmarks transformed from the initial landmarks through the first normalizing, second normalizing the facial image after the updating and recognizing a face using a feature of the second normalized facial image.

15 Claims, 7 Drawing Sheets

(52) U.S. Cl.
CPC ..... *G06K 9/00281* (2013.01); *G06K 9/00288* (2013.01); *G06K 9/6209* (2013.01); *G06K 9/6278* (2013.01); *G06K 9/6296* (2013.01); *G06K 2209/21* (2013.01)

(58) Field of Classification Search
CPC ... G06K 9/6209; G06K 9/6278; G06K 9/6296
USPC ........................................................ 348/156
See application file for complete search history.

(56) References Cited

U.S. PATENT DOCUMENTS

| | | | |
|---|---|---|---|
| 7,292,737 B2 | 11/2007 | Zhou et al. | |
| 7,974,475 B1 * | 7/2011 | Minter | G06K 9/6278 382/159 |
| 8,457,367 B1 | 6/2013 | Sipe et al. | |
| 2005/0201595 A1 * | 9/2005 | Kamei | G06K 9/00275 382/118 |
| 2006/0133672 A1 | 6/2006 | Li | |
| 2007/0230773 A1 * | 10/2007 | Nagao | G06K 9/00281 382/159 |
| 2008/0187213 A1 | 8/2008 | Zhang et al. | |
| 2008/0192980 A1 * | 8/2008 | Park | G06K 9/00221 382/103 |
| 2009/0220156 A1 * | 9/2009 | Ito | G06K 9/00248 382/201 |
| 2009/0262989 A1 * | 10/2009 | Kozakaya | G06K 9/00208 382/118 |
| 2012/0044335 A1 | 2/2012 | Goto | |
| 2012/0308124 A1 | 12/2012 | Belhumeur et al. | |
| 2013/0129210 A1 | 5/2013 | Na | |
| 2013/0148860 A1 * | 6/2013 | Musatenko | G06K 9/00228 382/107 |
| 2013/0167212 A1 * | 6/2013 | Azar | G06F 21/32 726/7 |
| 2013/0243278 A1 * | 9/2013 | Saito | G06K 9/00281 382/128 |
| 2014/0108054 A1 | 4/2014 | Udani | |

FOREIGN PATENT DOCUMENTS

| | | |
|---|---|---|
| KR | 10-1000130 B1 | 12/2010 |
| KR | 10-1105435 B1 | 1/2012 |
| KR | 2013-0139338 A | 12/2013 |

OTHER PUBLICATIONS

European Office Action dated May 24, 2017.
Beumer, G.M. et al., "A landmark paper in face recognition," IEEE, pp. 73-78, 2006.
Extended European Search Report dated Mar. 16, 2016.

* cited by examiner

METHOD AND APPARATUS FOR FACIAL RECOGNITION

CROSS-REFERENCE TO RELATED APPLICATION

This application claims the priority benefit of Korean Patent Application No. 10-2014-0102177, filed on Aug. 8, 2014, in the Korean Intellectual Property Office, the disclosure of which is incorporated herein by reference in its entirety.

BACKGROUND

1. Field

At least some example embodiments relate to a method and an apparatus for facial recognition.

2. Description of the Related Art

Security has been used in various fields including, for example, banking and technical information protection. An increasing number of security cameras have been installed in these fields. In addition, facial recognition has been used in various applications, for example, permission for access at an entrance or an exit of a building and user authentication of a personal terminal.

In general, the facial recognition may be performed based on a front face of a user. Thus, when a change in a pose taken by the user is substantial, for example, when the user faces another direction other than a front side, transforming a face of the user in such a pose to the front face may be implemented. Also, when a distance between the user and a camera is great, normalization through which a size of a facial image of the user is transformed to a face recognizable size may be used to recognize the face of the user using a feature extracted from the facial image obtained by the transforming.

SUMMARY

When a position of a landmark indicating a major portion of the face of the user that exhibits a great change in terms of the pose or the size is changed, a recognition rate of recognizing the face of the user may decrease.

At least one example embodiment relates to a facial recognition method.

According to an example embodiment, the facial recognition method includes detecting initial landmarks from a facial image, first normalizing the facial image using the initial landmarks, updating a position of at least one of intermediate landmarks based on the first normalizing, the intermediate landmarks being landmarks transformed from the initial landmarks through the first normalizing, second normalizing the facial image after the updating, and recognizing a face using a feature of the second normalized facial image.

At least some example embodiments provide that the updating includes updating the position of the at least one intermediate landmark using a confidence of the position of the at least one intermediate landmark.

At least some example embodiments provide that the updating includes calculating the confidence of the position of the at least one intermediate landmark, comparing the confidence to a confidence threshold, and updating the position of the at least one intermediate landmark based on the comparing.

At least some example embodiments provide that the updating includes calculating confidences of adjacent pixels of the at least one intermediate landmark if the confidence of the position of the at least one intermediate landmark is less than the confidence threshold, and updating the position of the at least one intermediate landmark based on a position of the pixel having a highest confidence among the adjacent pixels.

At least some example embodiments provide that the updating includes comparing a difference between the confidence of the position of the pixel having the highest confidence and the confidence of the position of the at least one intermediate landmark to a threshold, and updating the position of the at least one intermediate landmark based on the comparing the difference to the threshold.

At least some example embodiments provide that the calculating calculates the confidence using a probabilistic model.

At least some example embodiments provide that the probabilistic model includes a probabilistic model based on a joint Bayesian method.

At least some example embodiments provide that the probabilistic model includes a probabilistic model based on a maximum a posteriori (MAP) probability.

At least some example embodiments provide that the probabilistic model includes a probabilistic model based on a maximum likelihood.

At least some example embodiments provide that the second normalizing includes estimating a transformation function based on the updated position of the at least one intermediate landmark, the transformation function associated with a linear transformation, and transforming the updated position of the at least one intermediate landmark based on the transformation function to a second normalized position.

At least some example embodiments provide that the estimating includes comparing a distance between the updated position of the at least one intermediate landmark and the position of the at least one intermediate landmark prior to the updating to a distance threshold, and estimating the transformation function if the distance is greater than or equal to the distance threshold.

At least some example embodiments provide that, the transforming of the position is based on the comparing.

At least one example embodiment relates to a facial recognition apparatus.

According to an example embodiment, the facial recognition apparatus includes an interface configured to receive a facial image, and a processor configured to first normalize the facial image using initial landmarks detected from the facial image, update a position of at least one of intermediate landmarks based on the first normalizing, the intermediate landmarks being landmarks transformed from the initial landmarks through the normalizing, second normalize the facial image after the updating, and recognize a face using a feature of the second normalized facial image.

At least some example embodiments provide that the processor is configured to update the position of the at least one intermediate landmark using a confidence of the position of the at least one intermediate landmark.

At least some example embodiments provide that the processor is configured to calculate the confidence of the position of the at least one intermediate landmark, compare the confidence to a confidence threshold, and update the position of the at least one intermediate landmark based on the comparing.

At least some example embodiments provide that the processor is configured to calculate confidences of adjacent pixels of the at least one intermediate landmark if the confidence of the position of the at least one intermediate landmark is less than the confidence threshold, and update the position of the at least one intermediate landmark based on a position of a pixel having a highest confidence among the adjacent pixels.

At least some example embodiments provide that the processor is configured to calculate the confidence using a probabilistic model.

At least some example embodiments provide that the processor is configured to estimate a transformation function associated with a linear transformation based on the updated position of the at least one intermediate landmark, and transform the updated position of the at least one intermediate landmark to a second normalized position.

At least some example embodiments provide that the processor is configured to compare a distance between the updated position of the at least one intermediate landmark and the position of the at least one intermediate landmark prior to the updating to a distance threshold and estimate the transformation function associated with the linear transformation if the distance is greater than or equal to the distance threshold.

At least one example embodiment discloses an electronic apparatus including an image facial recognition system having a memory configured to store instructions and a processor configured to access the instructions and configured to obtain a facial image, perform two normalization operations on the facial image and extract a feature from the facial image after the two normalization operations.

In an example embodiment, the processor is configured to detect at least one landmark in the facial image, perform a first normalization operation on the facial image, review a position of the at least one landmark in the first normalized facial image and perform a second normalization operation after the reviewing.

In an example embodiment, the processor is configured to review the position of the at least one landmark by updating the position of the at least one landmark based on a confidence of the position of the at least one landmark.

In an example embodiment, the processor is configured to perform the second normalization operation based on the updated position of the at least one landmark.

In an example embodiment, the electronic apparatus is a camera.

In an example embodiment, the electronic apparatus is a tablet.

In an example embodiment, the electronic apparatus is computer.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
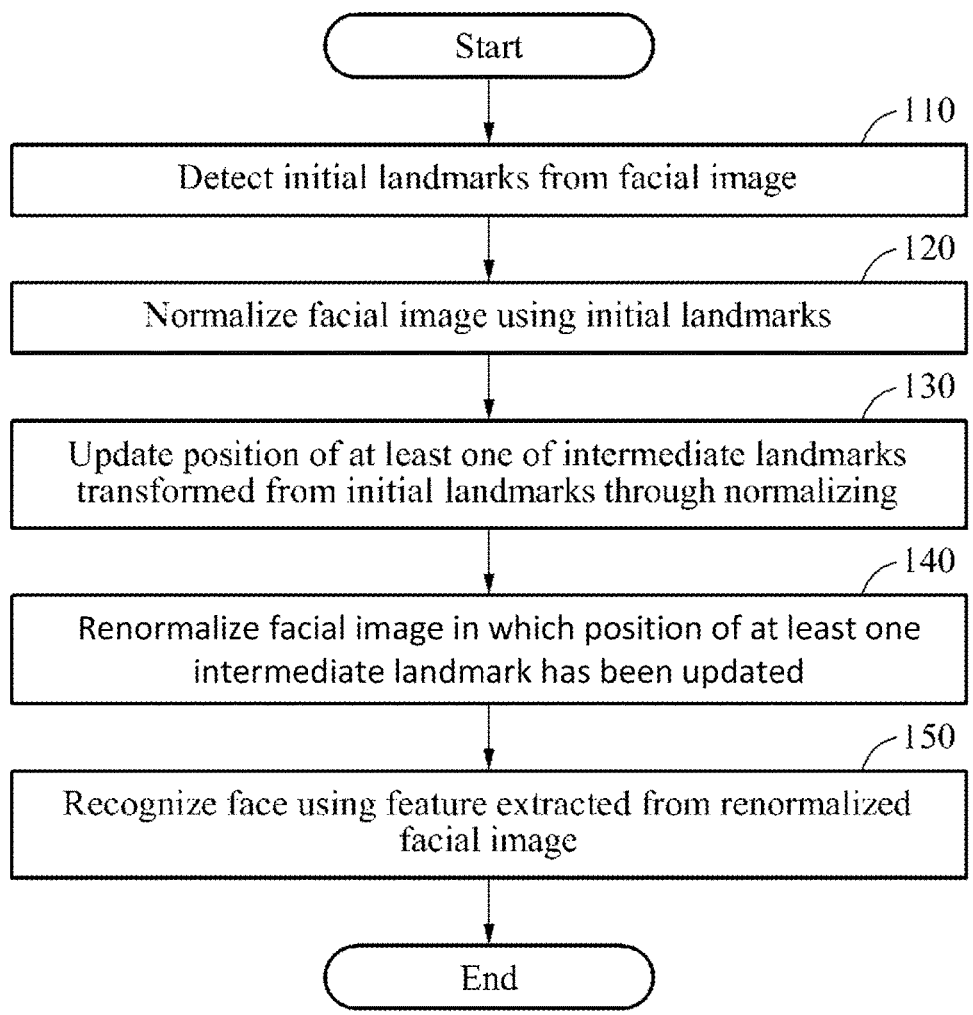
FIG. 1 is a flowchart illustrating a facial recognition method according to at least one example embodiment.

Reference will now be made in detail to embodiments, examples of which are illustrated in the accompanying drawings, wherein like reference numerals refer to like elements throughout. Example embodiments are described below to explain the present disclosure by referring to the figures.

In the drawings, the thicknesses of layers and regions are exaggerated for clarity. Like reference numerals in the drawings denote like elements.

Detailed illustrative example embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a flowchart illustrating a facial recognition method according to at least one example embodiment.

Referring to FIG. 1, in operation 110, an apparatus for recognizing a face, hereinafter referred to as a facial recognition apparatus, detects a plurality of initial landmarks from a facial image.

A landmark may refer to a feature point of a face with which a feature of the face may be obtained from a facial image and include, for example, ends of an eye, ends of a lip, a noise, and eyebrows. The initial landmarks may refer to landmarks initially detected from the facial image. A phrase "detect a landmark" described herein may be construed as locating a position that is estimated as the landmark.

In operation 110, when an image including the facial image is input, the facial recognition apparatus may detect the facial image from the input image and detect the initial landmarks of a detected face region. Examples of the initial landmarks detected from the facial image will be illustrated with reference to FIG. 2.

In operation 120, the facial recognition apparatus normalizes the facial image using the initial landmarks detected in operation 110. The facial recognition apparatus may adjust a size of the facial image through normalization or transform the facial image in which various poses is taken to an image of a front face.

In operation 130, the facial recognition apparatus updates a position of at least one of intermediate landmarks obtained from the initial landmarks transformed through the normalization performed in operation 120. The intermediate landmarks may refer to the initial landmarks subsequent to the normalization because positions may be changed through the normalization.

In operation 130, the facial recognition apparatus updates the position of the at least one intermediate landmark using a confidence. The confidence may be calculated by the facial recognition apparatus using a probabilistic model. The confidence may be construed as being a confidence probability value that is calculated by the facial recognition apparatus through the probabilistic model or a value that may be mathematically expressed. An example embodiment of a method of updating the position of the at least one intermediate landmark using the confidence will be described in detail with reference to FIGS. 3 and 4.

In operation 140, the facial recognition apparatus renormalizes the facial image in which the position of the at least one intermediate landmark has been updated. An example embodiment of a method of renormalizing the facial image by the facial recognition apparatus will be described in detail with reference to FIG. 5.

In operation 150, the facial recognition apparatus recognizes a face using a feature extracted from the renormalized facial image. The extracted feature may include a feature vector. In an example, the facial recognition apparatus may extract a feature vector corresponding to a landmark included in the normalized facial image or the renormalized facial image. The feature vector corresponding to the landmark may indicate a distinct property possessed by a partial image corresponding to the landmark. For example, the feature vector may include an n-dimensional vector expressing the landmark.

Dissimilar to the initial landmarks detected in operation 110 (illustrated as $L_1$ through $L_{17}$ in FIG. 2), the extracted feature may be obtained as a result of renormalizing the initial landmarks. In other words, the intermediate landmarks with updated positions are used by the facial recognition apparatus to obtain the extracted feature.

According to example embodiments, accuracy in a position of a landmark may increase and thus, accuracy in extracting a facial feature may be improved by updating a position of an intermediate landmark in the normalized facial image.

In addition, a face may be more accurately recognized despite a large change in a pose in a facial image by renormalizing the facial image in which a position of an intermediate landmark is updated.

Figure 2:
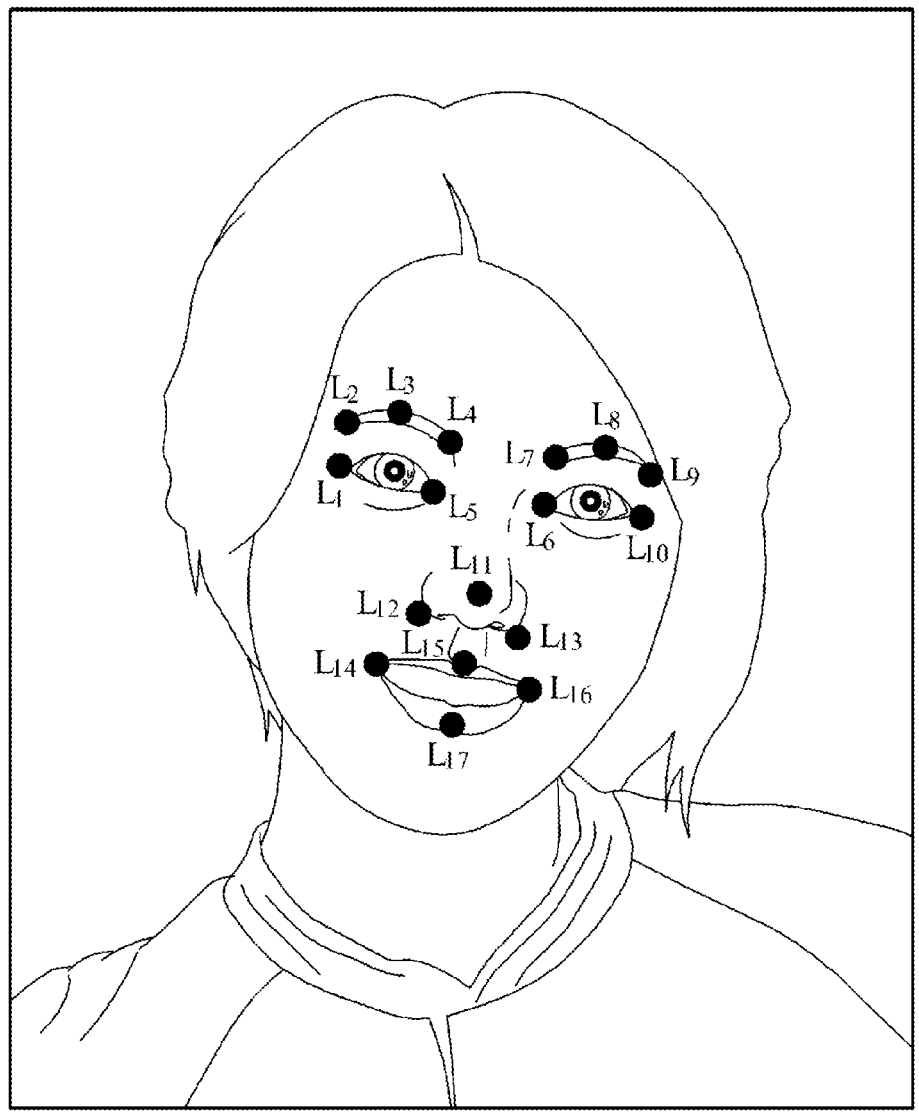
FIG. 2 illustrates initial landmarks detected using a facial recognition method according to at least one example embodiment.

FIG. 2 illustrates initial landmarks detected using a facial recognition method according to at least one example embodiment.

FIG. 2 illustrates initial landmarks, for example, $L_1$ through $L_{17}$, detected from a facial image.

As previously described, a landmark may refer to a feature point of a face with which a feature of the face may be obtained from a facial image. The initial landmarks may be detected at ends of eyes, for example, $L_1$, $L_5$, $L_6$, and $L_{10}$, and on eyebrows, for example, $L_2$, $L_3$, $L_4$, $L_7$, $L_8$, and $L_9$. Similarly, the initial landmarks may be detected in a nose portion, for example, $L_{11}$, $L_{12}$, and $L_{13}$, and in a lip portion, for example, $L_{14}$, $L_{15}$, $L_{16}$, and $L_{17}$.

Figure 3:
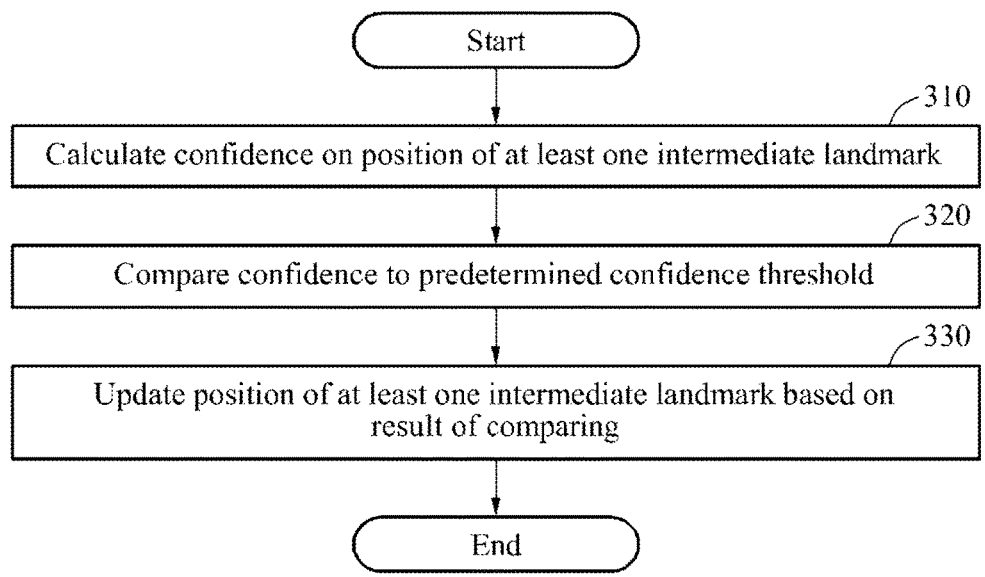
FIG. 3 is a flowchart illustrating a method of updating a position of at least one intermediate landmark according to at least one example embodiment.

FIG. 3 is a flowchart illustrating a method of updating a position of at least one intermediate landmark according to at least one example embodiment. For example, the method shown in FIG. 3 may be used in operation 130.

Referring to FIG. 3, in operation 310, a facial recognition apparatus normalizes a facial image from which initial landmarks are detected, and calculates a confidence of a position of at least one intermediate landmark included in a normalized facial image of a facial image from which initial landmarks are detected. The confidence may be calculated using a probabilistic model. The probabilistic model may include at least one of a probabilistic model using a joint Bayesian method, a probabilistic model based on a maximum a posteriori (MAP) probability, and a probabilistic model using maximum likelihood estimation.

In operation 320, the facial recognition apparatus compares the confidence calculated in operation 310 to a predetermined and/or desired confidence threshold.

In operation 330, when the calculated confidence is less than the predetermined and/or desired confidence threshold, the facial recognition apparatus updates the position of the at least one intermediate landmark based on a result of the comparing performed in operation 320.

Figure 4:
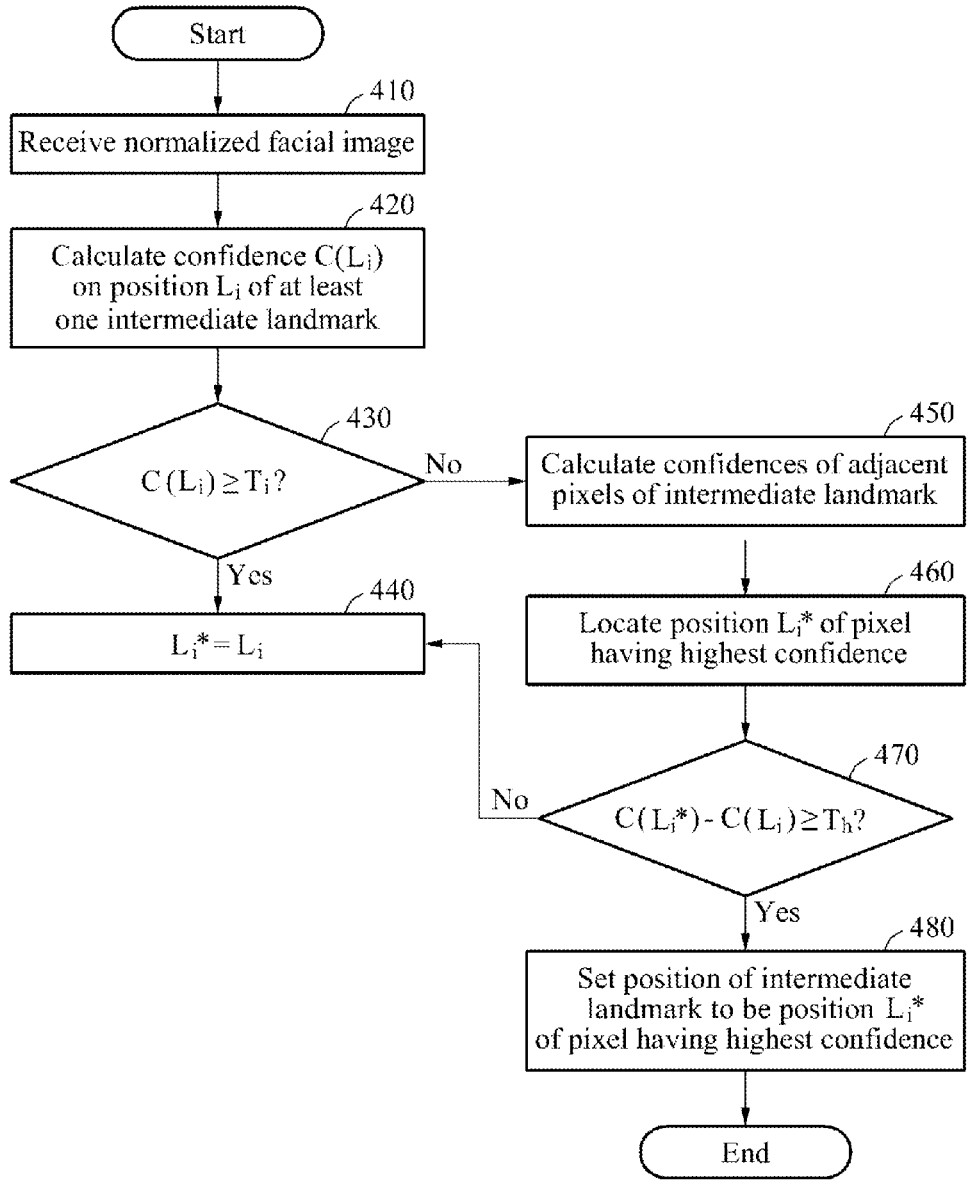
FIG. 4 is a flowchart illustrating a method of updating a position of at least one intermediate landmark according to at least one example embodiment.

FIG. 4 is a flowchart illustrating another method of updating a position of at least one intermediate landmark according to at least one example embodiment. For example, the method shown in FIG. 4 may be used in operation 130.

Referring to FIG. 4, in operation 410, a facial recognition apparatus receives a normalized facial image. The facial recognition apparatus may detect, from the normalized facial image, information on a position ($L_i$) of at least one intermediate landmark transformed from an initial landmark through the normalizing.

In operation 420, the facial recognition apparatus calculates a confidence ($C(L_i)$) on the position of the at least one intermediate landmark, for example, a position ($L_i$) of an i-th intermediate landmark, using positions of intermediate landmarks included in the normalized facial image. In "$L_i$," "i" may indicate 1, 2, ..., M. The confidence may be calculated using various probabilistic models. A method of calculating the confidence using the various probabilistic models will be described subsequent to a description provided with reference to FIG. 4.

In operation 430, the facial recognition apparatus determines whether the confidence of the position of the at least one intermediate landmark is greater than or equal to a confidence threshold ($T_i$).

In operation 440, when the confidence is greater than or equal to the confidence threshold as a result of the determining performed in operation 430, the facial recognition apparatus determines the position ($L_i$) of the intermediate landmark, or the position of the initial landmark subsequent to the normalizing, to be a valid position ($L_i^*$). Here, the facial recognition apparatus may not update the position of the intermediate landmark.

In operation 450, when the confidence is less than the confidence threshold as the result of the determining performed in operation 430, the facial recognition apparatus calculates confidences of adjacent pixels of the intermediate landmark.

In operation 460, the facial recognition apparatus locates a position of a pixel having a highest confidence among the adjacent pixels. In an example, the facial recognition apparatus may determine the position of the pixel having the highest confidence to be a valid position ($L_i^*$). In another example, the facial recognition apparatus may calculate a confidence of a voxel including at least one pixel, and locate a position of a voxel having a highest confidence among adjacent voxels.

In operation 470, the facial recognition apparatus compares, to a threshold ($T_h$), a difference between a confidence ($C(L_i^*)$) on the position of the pixel having the highest confidence (or the valid position ($L_i^*$)) and the confidence ($C(L_i)$) on the position of the intermediate landmark.

In operation 480, when the difference between the confidence in the position of the pixel having the highest confidence and the confidence in the position of the intermediate landmark is greater than or equal to the threshold as a result of the comparing performed in operation 470, the facial recognition apparatus updates the position of the intermediate landmark, for example, the i-th intermediate landmark, to the position of the pixel having the highest confidence (or the valid position) as a new position of the intermediate landmark.

When the difference between the confidence in the position of the pixel having the highest confidence and the confidence in the position of the intermediate landmark is less than the threshold as the result of the comparing performed in operation 470, the facial recognition apparatus does not update the position of the intermediate landmark at operation 440.

In the method of updating the position of the at least one intermediate landmark, operation 470 may be optionally performed. For example, the facial recognition apparatus may locate the position of the pixel having the highest confidence in operation 460, and update the position of the i-th intermediate landmark to the position of the corresponding pixel as a new position of the i-th intermediate landmark in operation 480.

The method of updating the position of the at least one intermediate landmark described with reference to FIG. 4 may be performed on positions of all landmarks, or on a certain landmark among the all landmarks.

A method of calculating the confidence using the various probabilistic models will be described below. The method of calculating the confidence may be used by a facial recognition apparatus in operation 310 and 420, for example.

For example, a probabilistic model using a joint Bayesian method may use a prior probability. In the probabilistic model using the joint Bayesian method, each intermediate landmark may be expressed as a feature vector x having a sum of two random variables following a normal Gaussian distribution as in Equation 1.

$$x = \mu + \varepsilon \quad \text{[Equation 1]}$$

In Equation 1, $\mu \sim N(0, S_\mu)$, $\varepsilon \sim N(0, S_\varepsilon)$, and $\mu$ and $\varepsilon$ are independent from each other.

In Equation 1, $\mu$ denotes a random variable indicating a characteristic part, or a feature vector, and $\varepsilon$ denotes a random variable indicating a variation part. "$S_\mu$" denotes a covariance matrix of the random variable $\mu$, and "$S_\varepsilon$" denotes a covariance matrix of the random variable $\varepsilon$.

A feature vector x extracted from a landmark, for example, an end of a left eye, may be expressed as a sum of the random variable $\mu$ indicating the landmark and the random variable $\varepsilon$ indicating a variation and noise.

Here, $\mu$ may be $\mu \sim N(0, S_\mu)$, which indicates that $\mu$ follows the normal Gaussian probability distribution with an average of "0" and the covariance matrix $S\mu$. Similarly, $\varepsilon$ may be $\varepsilon \sim N(0, S_\varepsilon)$, which indicates that $\varepsilon$ follows the normal Gaussian probability distribution with an average of "0" and the covariance matrix $S\varepsilon$.

The feature vector x may include the characteristic part $\mu$, which is invariable, and the variation part $\varepsilon$, which is variable. For example, the variation part $\varepsilon$ may indicate a variation depending on lighting, a pose, an expression, and the like.

When each of the characteristic part and the variation part indicates a normal Gaussian distribution, and the two parts are independent from each other, a joint distribution as in Equation 2 may be used.

For example, when a known feature vector, for example, a mean feature vector, which is learned through training on a landmark ($L_i$) is "$\mu_1$," a feature vector "$x_1$" on a position of the landmark ($L_i$) may be obtained based on "$\mu_1 + \varepsilon_1$" through the training. When a feature vector on a position located as the landmark ($L_i$) through landmark detection is $x_2$, then $\mu 1$ may be $\mu_2$ ($\mu_1 = \mu_2$) under a hypothesis ($H_I$) that the located position is correct as the position of the landmark ($L_i$). When $\varepsilon_1$ and $\varepsilon_2$ are independent from each other, a joint distribution of the feature vector $x_2$ having a zero mean and the feature vector $x_1$ learned through the training may be expressed as in Equation 2.

$$P(x_1, x_2 | H_I) \sim N(0, \Sigma_I) \quad \text{[Equation 2]}$$

In Equation 2, $$\Sigma_I = \begin{bmatrix} S_\mu + S_\varepsilon & S_\mu \\ S_\mu & S_\mu + S_\varepsilon \end{bmatrix},$$

which follows:

$$\Sigma_I = E[XX^T] = E\left[\begin{bmatrix} x_1 \\ x_2 \end{bmatrix} \begin{bmatrix} x_1^T & x_2^T \end{bmatrix}\right] = \begin{bmatrix} E[x_1 x_1^T] & E[x_1 x_2^T] \\ E[x_2 x_1^T] & E[x_2 x_2^T] \end{bmatrix}$$

$$= \begin{bmatrix} E[(\mu_1 + \varepsilon_1)(\mu_1 + \varepsilon_1)^T] & E[(\mu_1 + \varepsilon_1)(\mu_1 + \varepsilon_2)^T] \\ E[(\mu_1 + \varepsilon_2)(\mu_1 + \varepsilon_2)^T] & E[(\mu_2 + \varepsilon_2)(\mu_2 + \varepsilon_2)^T] \end{bmatrix}$$

$$= \begin{bmatrix} S_\mu + S_\varepsilon & S_\mu \\ S_\mu & S_\mu + S_\varepsilon \end{bmatrix}$$

Under a hypothesis ($H_E$) that the located position is not the position of the landmark ($L_i$), $\mu_1$ and $\mu_2$ may be independent from each other and $\varepsilon_1$ and $\varepsilon_2$ may be independent from each other. Thus, a joint distribution of the feature vector $x_2$ having a zero mean and the feature vector $x_1$ on the known landmark learned through the training may be expressed as Equation 3.

$$P(x_1, x_2 | H_E) \sim N(0, \Sigma_E) \quad \text{[Equation 3]}$$

In Equation 3, $$\Sigma_E = \begin{bmatrix} S_\mu + S_\varepsilon & 0 \\ 0 & S_\mu + S_\varepsilon \end{bmatrix},$$

and "$\Sigma_E$" may be calculated as follows:

$$\Sigma_E = E[XX^T] = E\left[\begin{bmatrix} x_1 \\ x_2 \end{bmatrix} \begin{bmatrix} x_1^T & x_2^T \end{bmatrix}\right] = \begin{bmatrix} E[x_1 x_1^T] & E[x_1 x_2^T] \\ E[x_2 x_1^T] & E[x_2 x_2^T] \end{bmatrix}$$

$$= \begin{bmatrix} E[(\mu_1 + \varepsilon_1)(\mu_1 + \varepsilon_1)^T] & E[(\mu_1 + \varepsilon_1)(\mu_2 + \varepsilon_2)^T] \\ E[(\mu_2 + \varepsilon_2)(\mu_1 + \varepsilon_1)^T] & E[(\mu_2 + \varepsilon_2)(\mu_2 + \varepsilon_2)^T] \end{bmatrix}$$

$$= \begin{bmatrix} S_\mu + S_\varepsilon & S_\mu \\ S_\mu & S_\mu + S_\varepsilon \end{bmatrix}$$

The joint distribution of the feature vector $x_2$ on the intermediate landmark, which is obtained based on Equations 2 and 3, and the feature vector $x_1$ on the landmark learned through the training may be indicated as a log likelihood ratio, which may be expressed as Equation 4.

$$r(x_1, x_2) = \log \frac{P(x_1, x_2 | H_I)}{P(x_1, x_2 | H_E)} = x_1^T A x_1 + x_2^T A x_2 - 2 x_1^T G x_2 \quad \text{[Equation 4]}$$

In Equation 4, $$A = (S_\mu + S_\varepsilon)^{-1} - (F + G) \text{ and } \begin{bmatrix} F + G & G \\ G & F + G \end{bmatrix} = \begin{bmatrix} S_\mu + S_\varepsilon & S_\mu \\ S_\mu & S_\mu + S_\varepsilon \end{bmatrix}^{-1},$$

and "F" and "G" are constants that may be determined by empirical data.

Equation 4 may be obtained by deploying the Gaussian distribution under the hypothesis $H_I$ and the Gaussian distribution under the hypothesis $H_E$ of Equations 2 and 3 and, omitting a constant part.

The log likelihood ratio r obtained from using Equation 4 may be used as a confidence C.

A method of calculating the confidence using an MAP probabilistic model to maximize a probability with respect to given data will be described with reference to Equation 5.

$$P(l_{i,p} | x_p) \propto P(x_p | l_{i,p}) P(l_{i,p}) \quad \text{[Equation 5]}$$

In Equation 5, $P(l_{i,p} | x_p)$ denotes a probability that a feature vector $x_p$ extracted from a given position p indicates an i-th intermediate landmark $l_{i,p}$. "$P(x_p | l_{i,p})$" denotes a likelihood distribution of a feature vector of a certain landmark, and "$P(l_{i,p})$" denotes a prior probability with respect to a position of a certain landmark.

The probability $P(l_{i,p} | x_p)$ that the feature vector extracted from the given position indicates the i-th intermediate landmark may be obtained by multiplying the likelihood distribution $P(x_p | l_{i,p})$, which is learned by the facial recognition apparatus on each intermediate landmark, by the prior probability $P(l_{i,p})$, which is learned by the facial recognition apparatus on the position of the intermediate landmark.

The probability $P(l_{i,p} | x_p)$ may be used as a confidence C.

A method of calculating the confidence using a probabilistic model maximizing a likelihood will be described with reference to Equation 6.

$$P(\vec{f}_{i,p} | \vec{\mu}_i, \sigma_i I) \propto e^{-\frac{\|\vec{f}_{i,p} - \vec{\mu}_i\|^2}{\sigma_i^2}} = e^{-\frac{\|x_p - \vec{\mu}_i^x\|^2}{\sigma_i^2}} e^{-\frac{\|x_p - \vec{\mu}_i^l\|^2}{\sigma_i^2}} \quad \text{[Equation 6]}$$

In Equation 6, $$\vec{f}_{i,p} = \begin{bmatrix} x_p \\ l_{i,p} \end{bmatrix} \text{ and } \vec{\mu}_i = \begin{bmatrix} \vec{\mu}_i^x \\ \vec{\mu}_i^l \end{bmatrix},$$

where a mean pixel position of a landmark ($L_i$) learned through training may be indicated as $\vec{\mu}_i^1$, and a mean vector of feature vectors extracted from the landmark ($L_i$) may be indicated as $\vec{\mu}_x^1$.

Here, a Gaussian distribution with respect to a vector $\vec{f}_{i,p}$ including a feature vector $x_p$ extracted based on a pixel position $l_{i,p}$ estimated as a pixel position of the landmark ($L_i$) may be assumed. When a spherical Gaussian distribution is assumed during the training, a covariance matrix that may determine a characteristic of the Gaussian distribution with respect to the landmark ($L_i$) may be expressed in a form of $\sigma_i I$.

When the spherical Gaussian distribution is assumed and learned as in Equation 6, a similarity of a feature at a current position may be probabilistically obtained based on a likelihood with respect to a certain landmark. A probability $P(\vec{f}_{i,p} | \vec{\mu}_i, \sigma_i I)$ obtained based on Equation 6 may be used as a confidence C.

Figure 5:
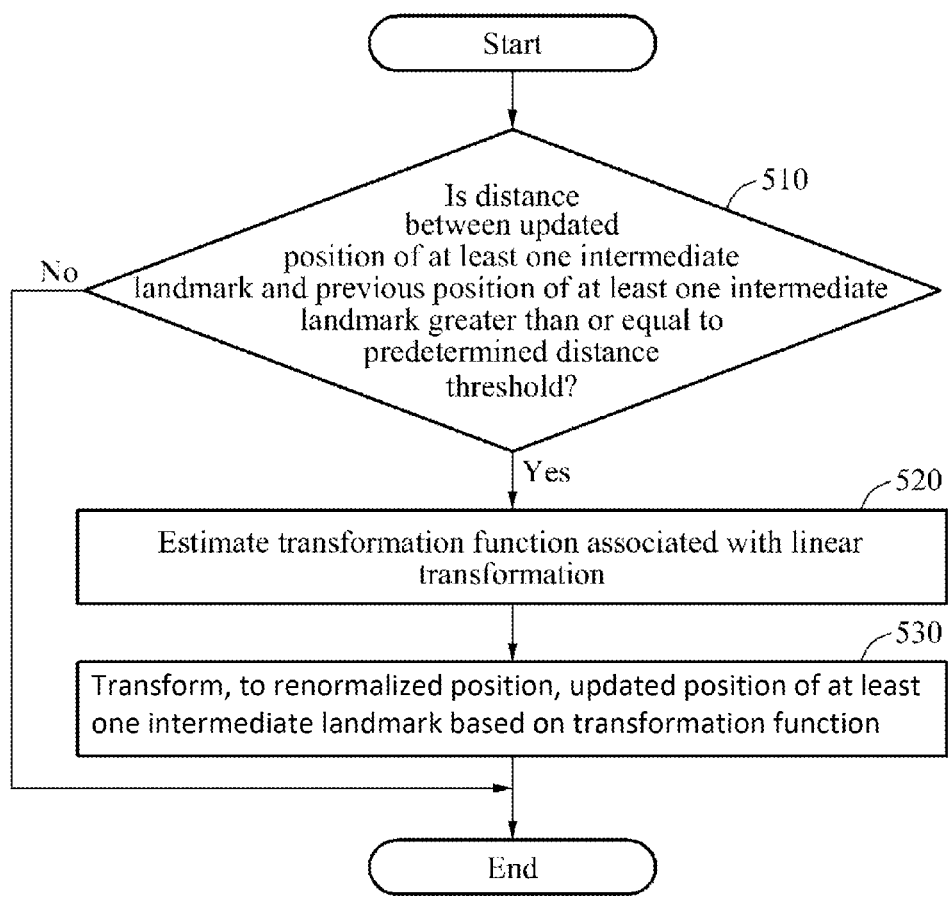
FIG. 5 is a flowchart illustrating a method of renormalizing a facial image according to at least one example embodiment.

FIG. 5 is a flowchart illustrating a method of renormalizing a facial image according to at least one example embodiment. For example, the method shown in FIG. 5 may be used in operation 140.

Referring to FIG. 5, in operation 510, a facial recognition apparatus compares a distance between a position of at least one intermediate landmark and an updated position of the at least one intermediate landmark to a predetermined and/or desired distance threshold. The distance threshold may be based on empirical data.

In operation 520, when the distance is greater than or equal to the distance threshold as a result of the comparing performed in operation 510, the facial recognition apparatus estimates a transformation function associated with a linear transformation.

In operation 530, the facial recognition apparatus transforms the updated position of the at least one intermediate landmark to a renormalized position based on the transformation function estimated in operation 520.

When the distance is less than the distance threshold as the result of the comparing performed in operation 510, the facial recognition apparatus may not transform the position of the at least one intermediate landmark to the renormalized position.

According to example embodiments, when the position of the at least one intermediate landmark is updated, the facial recognition apparatus may perform renormalization by estimating the transformation function associated with the linear transformation based on the updated position of the at least one intermediate landmark.

The renormalization may refer to a task of translating a position of an intermediate landmark to a new position by estimating the transformation function association with the linear transformation such as an affine transformation.

For example, the facial recognition apparatus may locate a position of an intermediate landmark based on the transformation function translating the position, for example, two points corresponding to centers of both eyes, one point corresponding to a nose tip, and two points corresponding to mouth corners, to certain positions. When the transformation function is found, the same transformation function may be applied to positions of remaining intermediate landmarks excluding the centers of the eyes, the nose tip, and the mouth corners, and the updated position of the at least one intermediate landmark may then be transformed to the renormalized position.

Figure 6:
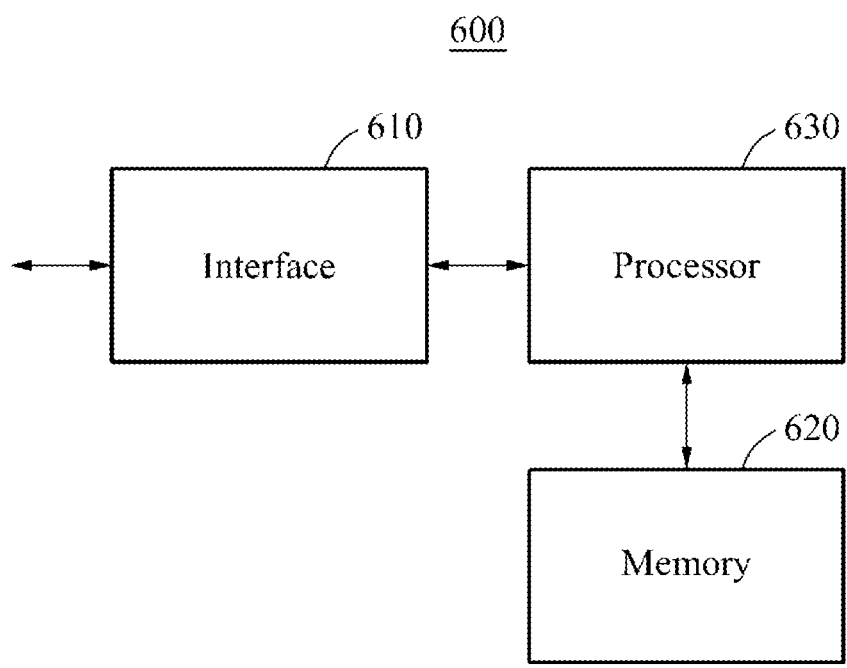
FIG. 6 is a block diagram illustrating a facial recognition apparatus according to at least one example embodiments.

FIG. 6 is a block diagram illustrating a facial recognition apparatus 600 according to at least one example embodiment.

Referring to FIG. 6, the facial recognition apparatus 600 includes an interface 610, a memory 620, and a processor 630.

The interface 610 may receive a facial image or an image including the facial image.

The memory 620 may record a computer-readable program command that may be used to perform signal processing on the facial image received from the interface 610 and recognize a face.

The processor 630 may execute the program command recorded in the memory 620 and control the facial recognition apparatus to perform the methods described with reference to FIGS. 1-5.

The processor 630 may normalize the facial image using initial landmarks detected from the facial image.

The processor 630 may update a position of at least one of intermediate landmarks transformed from the initial landmarks through the normalizing.

The processor 630 may update the position of the at least one intermediate landmark using a confidence of the position of the at least one intermediate landmark. The processor 630 may calculate the confidence of the position of the at least one intermediate landmark, and compare the confidence to a confidence threshold. The processor 630 may update the position of the at least one intermediate landmark based on a result of the comparing.

When the confidence of the position of the at least one intermediate landmark is less than the confidence threshold, the processor 630 may calculate confidences of adjacent pixels of the at least one intermediate landmark. The processor 630 may update the position of the at least one intermediate landmark based on a position of a pixel having a highest confidence among the adjacent pixels. The confidence may be calculated using a probabilistic model.

The processor 630 may renormalize the facial image in which the position of the at least one intermediate landmark is updated. The processor 630 may estimate a transformation function associated with a linear transformation based on the updated position of the at least one intermediate landmark, and transform the position of the at least one intermediate landmark updated based on the transformation function to be a renormalized position.

The processor 630 may compare a distance between the updated position of the at least one intermediate landmark and the position of the at least one intermediate landmark prior to the updating to a predetermined and/or desired distance threshold.

When the distance is greater than or equal to the distance threshold, the processor 630 may estimate the transformation function associated with the linear transformation. Conversely, when the distance is less than the distance threshold, the processor 630 may not transform the position of the at least one intermediate landmark to the renormalized position.

The processor 630 may recognize a face using a feature extracted from the renormalized facial image.

Figure 7:
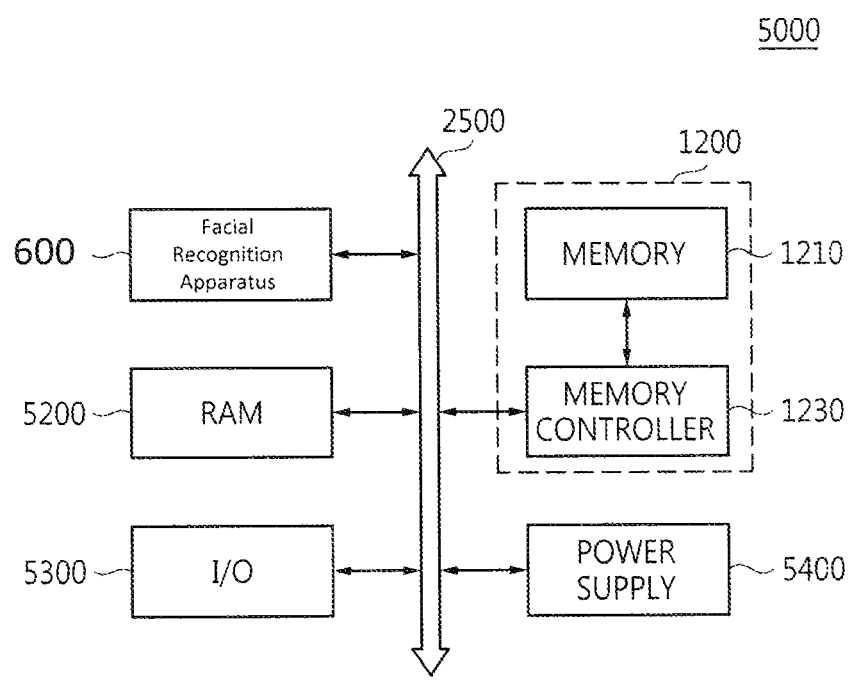
FIG. 7 is a block diagram of an electronic apparatus adopting a facial recognition apparatus according to at least one example embodiment.

FIG. 7 is a block diagram of an electronic apparatus adopting a facial recognition apparatus according to an example embodiment.

Referring to FIG. 7, an electronic apparatus 5000 includes the facial recognition apparatus 600, a random-access-memory (RAM) 5200, an input/output device 5300, a power supply device 5400, and a storage device 1200 including a memory 1210 and a memory controller 1230. The storage device 1200 may be considered part of the memory 620. Although not shown in FIG. 7, the electronic apparatus 5000 may further include ports that may communicate with video cards, sound cards, or universal serial bus (USB) devices, or other electronic devices. The electronic apparatus 5000 may be realized as a personal computer, a smart television (TV), video surveillance, or a portable electronic device such as a notebook computer, a mobile phone, tablet, a personal digital assistant (PDA), or a camera.

The facial recognition apparatus 600 may communicate with the RAM 5200, the input/output device 5300, and the storage device 1200 via a bus 2500 such as an address bus, a control bus, and a data bus. In some example embodiments, the facial recognition apparatus 600 may be connected to an expanded bus such as peripheral component interconnect (PCI) bus.

The RAM 5200 may store data that is used to operate the electronic apparatus 5000. For example, the RAM 5200 may be a dynamic RAM (DRAM), a mobile DRAM, an SRAM, a PRAM, an FRAM, an RRAM, and/or an MRAM.

The input/output device 5300 may include an input unit such as a keyboard, a keypad, or a mouse, and an output unit such as a printer or a display. The power supply device 5400 may supply an operating voltage to operate the electronic apparatus 5000.

The units and/or modules described herein may be implemented using hardware components and/or hardware executing software components. For example, the hardware components may include microphones, amplifiers, bandpass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media (e.g., the memory 620) including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A facial recognition method, comprising:
   detecting initial landmarks from a facial image;
   first normalizing the facial image using the initial landmarks;
   calculating a confidence of a position of at least one of intermediate landmarks, the intermediate landmarks being landmarks transformed from the initial landmarks through the first normalizing;
   comparing the confidence to a confidence threshold;
   calculating confidences of adjacent pixels of the at least one intermediate landmark if the confidence of the position of the at least one intermediate landmark is less than the confidence threshold;
   comparing a difference between the confidence of the position of the pixel having the highest confidence and the confidence of the position of the at least one intermediate landmark to a threshold;
   updating the position of the at least one intermediate landmark based on the comparing the difference to the threshold;
   second normalizing the facial image after the updating; and
   recognizing a lace using a feature of the second normalized facial image,
   wherein the second normalizing includes,
   estimating a transformation function based on the updated position of the at least one intermediate landmark, the transformation function associated with a linear transformation, and
   transforming the updated position of the at least one intermediate landmark based on the transformation function to a second normalized position.

2. The method of claim 1, wherein the calculating calculates the confidence using a probabilistic model.

3. The method of claim 2, wherein the probabilistic model comprises a probabilistic model based on a joint Bayesian method.

4. The method of claim 2, wherein the probabilistic model comprises a probabilistic model based on a maximum a posteriori (MAP) probability.

5. The method of claim 2, the probabilistic model comprises a probabilistic model based on a maximum likelihood.

6. The method of claim 1, wherein the estimating comprises: comparing a distance between the updated position of the at least one intermediate landmark and the position of the at least one intermediate landmark prior to the updating to a distance threshold; and estimating the transformation function if the distance is greater than or equal to the distance threshold.

7. The method of claim 6, wherein the transforming of the updated position is based on the comparing.

8. A non-transitory computer-readable medium comprising program code that, when executed by a processor, causes the processor to perform the method of claim 1.

9. A facial recognition apparatus, comprising:
   an interface configured to receive a facial image; and
   a processor configured to, first normalize the facial image using initial landmarks detected from the facial image,
calculate a confidence of a position of at least one of intermediate landmarks, the intermediate landmarks being landmarks transformed from the initial landmarks through the first normalizing,
compare the confidence to a confidence threshold,
calculate confidences of adjacent pixels of the at least one intermediate landmark if the confidence of the position of the at least one intermediate landmark is less than the confidence threshold,
compare a difference between the confidence of the position of the pixel having the highest confidence and the confidence of the position of the at least one intermediate landmark to a threshold,
update the position of the at least one intermediate landmark based on the comparison of the difference to the threshold,
second normalize the facial image after the updating, and
recognize a face using a feature of the second normalized facial image, wherein the processor is configured to update the position of the at least one intermediate landmark using a confidence of the position of the at least one intermediate landmark,
wherein the processor is configured to estimate a transformation function associated with a linear transformation based on the updated position of the at least one intermediate landmark, and transform the updated position of the at least one intermediate landmark based on the transformation function to a second normalized position.

10. The apparatus of claim 9, wherein the processor is configured to calculate the confidence using a probabilistic model.

11. The apparatus of claim 9, wherein the processor is configured to compare a distance between the updated position of the at least one intermediate landmark and the position of the at least one intermediate landmark prior to the updating to a distance threshold, wherein the processor is configured to estimate the transformation function associated with the linear transformation if the distance is greater than or equal to the distance threshold.

12. An electronic apparatus comprising:
an image facial recognition system including,
a memory configured to store instructions, and
a processor configured to execute the instructions to,
obtain a facial image,
detect at least one landmark in the facial image,
perform a first normalization operation on the facial image,
calculate a confidence of a position of at least one of intermediate landmarks, the intermediate landmarks being landmarks transformed from the at least one landmark through the first normalization,
compare the confidence to a confidence threshold,
calculate confidences of adjacent pixels of the at least one intermediate landmark if the confidence of the position of the at least one intermediate landmark is less than the confidence threshold,
compare a difference between the confidence of the position of the pixel having the highest confidence and the confidence of the position of the at least one intermediate landmark to a threshold,
review the position of the at least one landmark in the first normalized facial image by updating the position of the at least one intermediate landmark based on the comparison of the difference to the threshold,
perform a second normalization operation after the reviewing, and
extract is feature from the facial image after the first and second normalization operations,
wherein the processor is configured to estimate a transformation function associated with a linear transformation based on the updated position of the at least one intermediate landmark, and transform the updated position of the at least one intermediate landmark based on the transformation function to a second normalized position.

13. The electronic apparatus of claim 12, wherein the electronic apparatus is a camera.

14. The electronic apparatus of claim 12, wherein the electronic apparatus is a tablet.

15. The electronic apparatus of claim 12, wherein the electronic apparatus is a computer.

* * * * *

UNITED STATES PATENT AND TRADEMARK OFFICE
CERTIFICATE OF CORRECTION

PATENT NO. : 10,083,343 B2
APPLICATION NO. : 14/795002
DATED : September 25, 2018
INVENTOR(S) : Sungjoo Suh et al.

It is certified that error appears in the above-identified patent and that said Letters Patent is hereby corrected as shown below:

On the Title Page

(72) Inventors:
4th Inventor: -Jaejoon Han, Seoull (KR)-
Should read:
--Jaejoon Han, Seoul (KR)--

Signed and Sealed this
Twenty-third Day of April, 2019

Andrei Iancu
*Director of the United States Patent and Trademark Office*